July 6, 1965  H. H. MANNING  3,192,805
PLIERS
Filed April 17, 1963  2 Sheets-Sheet 2

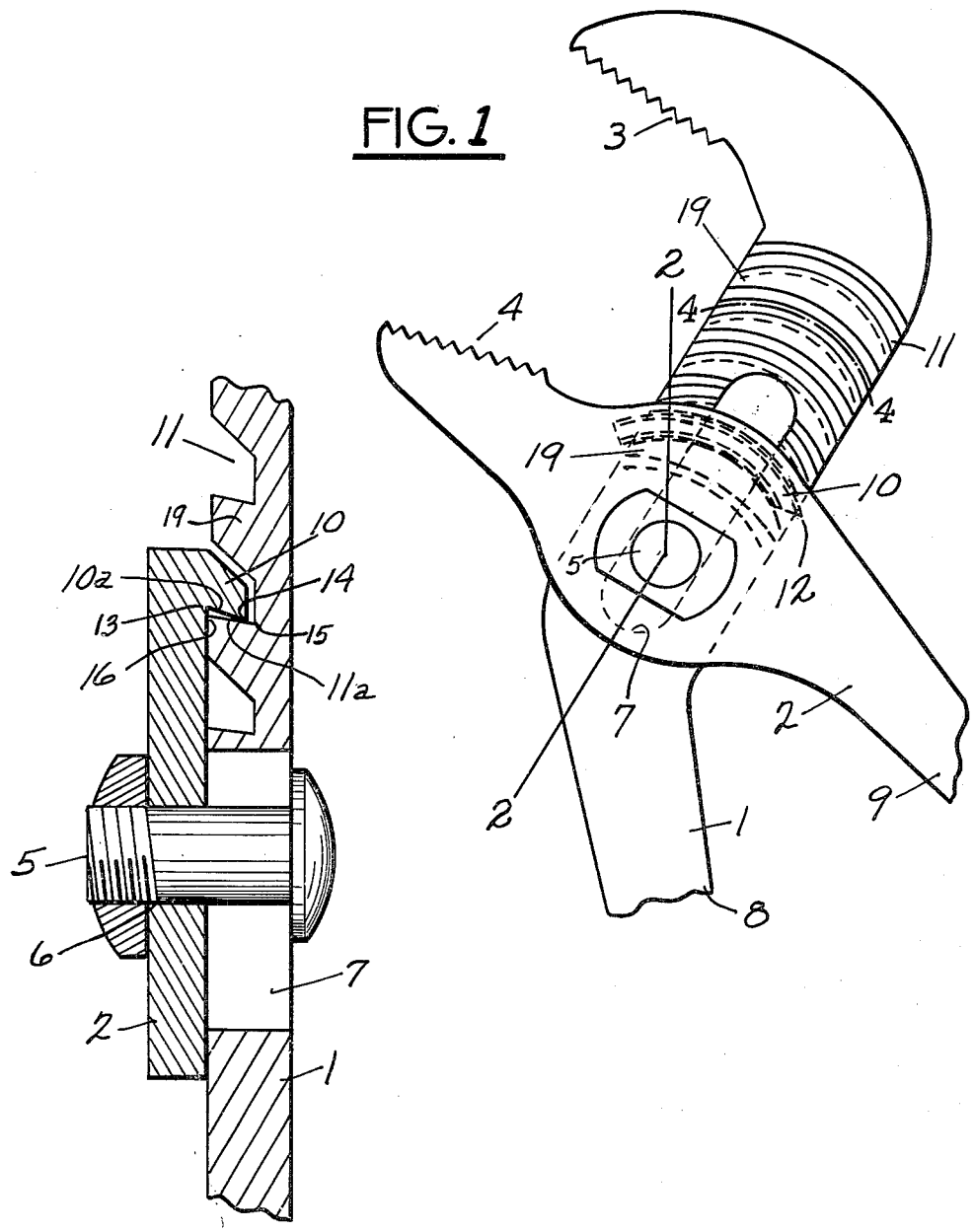

INVENTOR.
Howard H Manning
BY Ralph Hanuman
Attorney

3,192,805
PLIERS
Howard H. Manning, Meadville, Pa., assignor to Channellock, Inc., Meadville, Pa., a corporation of Pennsylvania
Filed Apr. 17, 1963, Ser. No. 273,703
3 Claims. (Cl. 81—414)

This invention is intended to increase the effective strength of pliers having crossed members pivoted by undercut tongue and groove joint elements centered on a slot in one of the members. The improvement is obtained by making the undercut on the tongue element greater than the undercut on the groove elements. This shifts the working stress toward the bottom of the grooves where the grooved plier member is strongest. In a preferred form, the undercut on the groove elements is part of a cylindrical surface and the undercut on the tongue element is part of a conical surface, both undercuts being of substantially the same inclination at the center line of the slot. However at the axis of greatest working stress, the effective inclination of the undercut in the groove element is less than the undercut of the tongue element and the working stress is, accordingly, shifted toward the bottom of the groove.

Figure 5:
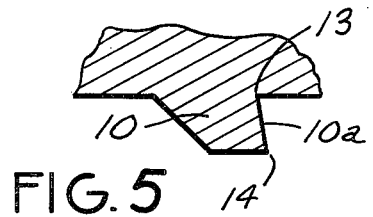
Figure 4:
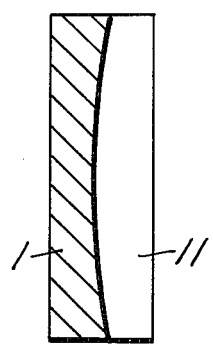
Figure 6:
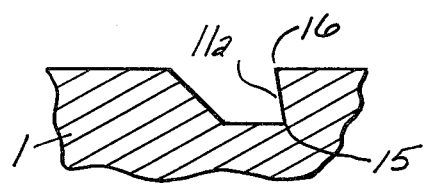
Figure 3:
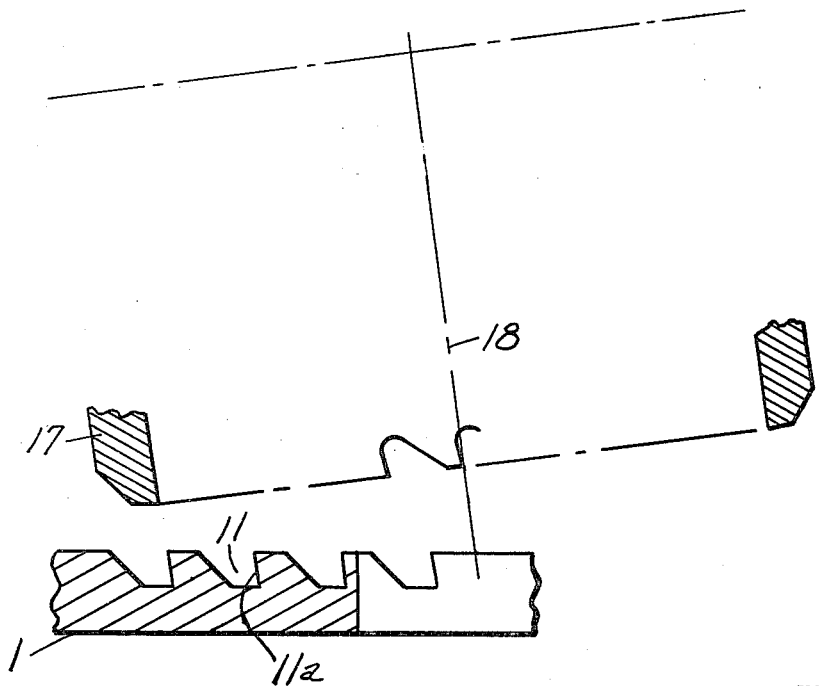

In the drawing, FIG. 1 is a plan view of a pair of pliers, FIG. 2 is a section on line 2—2 of FIG. 1, FIG. 3 is a diagrammatic sectional view showing one manner of cutting the undercut grooves, FIG. 4 is a cross section along circular path 4—4 at the bottom of one of the grooves, FIG. 5 is a section through the rib having an undercut conical pressure surface and FIG. 6 is a section through one of the grooves having an undercut cylindrical pressure surface.

The invention is shown applied to pliers of the construction shown in United States Patent 2,640,381. As there shown, the tool comprises crossed pivoted members 1 and 2 respectively provided with jaws 3 and 4 at one side of a pin or bolt 5 extending through an opening 6 in the member 2 and through a slot 7 in the member 1. On the opposite side of the bolt, the members are provided with handles 8 and 9. On the member 2 is an arcuate rib 10 receivable in any one of a plurality of complementary arcuate grooves 11 in the member 1. The range of opening between the jaws 3 and 4 is adjusted by sliding the member 2 along the slot 7 until the pointed or bevelled end 12 of the rib 10 comes opposite the desired groove 11.

The rib 10 is centered on the bolt 5 and has an undercut pressure surface 10a which is part of a conical surface. The conical surface is formed by rotating a cutting tool about the axis of the bolt 5 while feeding the tool along a path inclined at an angle to the axis. The radius of the surface 10a at point 13 measured from the axis of the bolt is greater than the radius at point 14 measured from the axis of the bolt. Each of the grooves 11 is centered on the center line of the slot 7 and has a similarly undercut pressure surface 11a which is part of the surface of a cylinder tilted or inclined to the axis of the bolt 5. The radius of surface 11a at point 15 is equal to the radius of surface 11a at point 16. Each of the grooves 11 has the same radius, but is cut from a different center on the center line of the slot 7. This makes the ribs 19 between adjacent grooves 11 wider at the center than at the ends. FIG. 3 shows one way of forming the grooves 11 with the undercut cylindrical pressure surface 11a. As there shown, a cutter 17 rotates about axis 18 inclined at the angle of undercut. As the tool is rotated about axis 18 and fed toward the plier member 1, the groove 11 is cut with the cylindrical surface 11a. The depth of the groove 11 varies along its length. FIG. 3, a section along the centerline of slot 7, shows the maximum depth. FIG. 4 shows the variation of the depth of the groove on either side of the centerline of the slot. A cutter similar to 17 cannot be used to form the undercut surface 10a; it would cut through member 2.

The engagement of the rib 10 with the pressure surface 11a of the selected groove is shown in FIG. 2. Note that the point 14 of the conical surface 10a of the rib is in contact with the lower portion of the pressure surface 11a of the groove and that the surface 10a diverges from the surface 11a. Note also that between points 13 and 16 there is a gap which insures that the pressure is at the lower part of the groove. Tests on the pliers have shown that the line of pressure of the rib 10 against the surface 11a of the groove 11 is approximately along line 2—2, the line upon which section of FIG. 2 was taken. Referring to FIG. 1, it will be noted that the thickness of the walls or ribs 19 separating the grooves 11 is less along line 2—2 than along the centerline of the slot 7. The condition shown in FIG. 2 is beneficial because it puts the pressure against the rib 19 toward the bottom of the groove 11 or at a point where the rib is strongest. Because all boundaries of the rib 10 are radial, it has the same cross section over its whole length and the condition shown in FIG. 2 obtains in all working positions of the pliers. Along the centerline of the slot 7, the gap between the points 13 and 16 will substantially disappear and there will be a substantial matching of the pressure surfaces 10a and 11a. The reason for this is that a cylindrical cutter with its axis inclined at the angle of the undercut has its maximum inclination or undercut at the centerline and a lesser inclination or undercut on opposite sides of the centerline. However, since the working pressure is always along line 2—2 and not along the centerline of the pliers, matching of the pressure surfaces on the rib and groove does not detract from the beneficial result.

Since it is the difference in inclination of the pressure faces which produces this result, the same result would be obtained if the grooves 11 had conical surfaces 11a of a lesser angle of undercut than the undercut of the conical surfaces 10a on the rib. Absorbing the pressure of the rib at the bottom of the groove where the wall of the groove is strongest is the important point.

What is claimed as new is:

1. In pliers having a pair of crossed members with a pivotal joint between the numbers comprising a pin in one member and a slot in the other member slidably receiving the pin and preventing lateral shifting of said one member relative to the other member in a direction crosswise of the slot but freely permitting movement of said one member relative to the other member lengthwise of the slot and with jaws on the members offset to one side of the centerline of the slot, said pivotal joint comprising an arcuate rib on said one member and a plurality of open ended grooves on the other member extending crosswise of the slot and separated from each other by walls of thickness decreasing on opposite sides of the centerline of the slot, the arcuate rib being centered on the pin and the grooves being centered on the center line of the slot, said rib being receivable in any one of the grooves to provide a connection between the members carrying the working pressure of the jaws, the rib and the groove in which the rib is received having surfaces engaging under working pressure of substantially the same radius and undercut at an angle to cause the engaging surfaces to cling together under working pressure, the angle of undercut on the engaging surface of the rib being greater than the angle of undercut on the engaging surface of the groove to shift the working pressure toward the bottom of the wall separating the grooves.

2. In pliers having a pair of crossed members with a pivotal joint between the numbers comprising a pin in one member and a slot in the other member slidably receiving the pin and preventing lateral shifting of said one member relative to the other member in a direction crosswise of the slot but freely permitting movement of said one member relative to the other member lengthwise of the slot and with jaws on the members offset to one side of the centerline of the slot, said pivotal joint comprising an arcuate rib on said one member and a plurality of open ended grooves on the other member extending crosswise of the slot and separated from each other by walls of thickness decreasing on opposite sides of the centerline of the slot, the arcuate rib being centered on the pin and the grooves being centered on the center line of the slot, said rib being receivable in any one of the grooves to provide a connection between the members carrying the working pressure of the jaws, the rib and the groove in which the rib is received having surfaces engaging under working pressure undercut at an angle to cause the engaging surfaces to cling together under working pressure, the engaging surface of the rib being conical with the smaller radius toward the bottom of the groove and the surface of the groove being cylindrical and of substantially the same radius as said smaller radius whreby the contact between said surfaces under working pressure is shifted toward the bottom of the wall separating the grooves.

3. In pliers having a pair of crossed members with a pivotal joint between the members comprising a pin in one member and a slot in the other member slidably receiving the pin and preventing lateral shifting of said one member relative to the other member in a direction crosswise of the slot but freely permitting movement of said one member relative to the other member lengthwise of the slot and with jaws on the members offset to one side of the centerline of the slot, said pivotal joint comprising an arcuate rib on said one member and a plurality of open ended grooves on the other member extending crosswise of the slot and adjacent grooves separated from each other by an arcuate wall, the arcuate rib being centered on the pin and the grooves being centered on the center line of the slot, said rib being receivable in any one of the grooves to provide a connection between the members carrying the working pressure of the jaws, the rib and the groove in which the rib is received having surfaces engaging under working pressure of substantially the same radius, the engaging surface of the rib being undercut and diverging from the bottom of the engaging surface of the groove to shift the working pressure toward the bottom of the wall separating the grooves.

References Cited by the Examiner

UNITED STATES PATENTS 2,640,381    6/53    Manning _____ 81—414

FOREIGN PATENTS 496,290    9/53    Canada.

WILLIAM FELDMAN, *Primary Examiner*.